United States Patent
Lintz et al.

(10) Patent No.: US 11,843,680 B2
(45) Date of Patent: Dec. 12, 2023

(54) METHODS AND SYSTEMS FOR CACHE OPTIMIZATION

(71) Applicant: COMCAST CABLE COMMUNICATIONS, LLC, Philadelphia, PA (US)

(72) Inventors: Christopher Lintz, Denver, CO (US); Tedd Dawson, Littleton, CO (US); Jeremy Pfeifer, Highlands Ranch, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 201 days.

(21) Appl. No.: 16/790,412

(22) Filed: Feb. 13, 2020

(65) Prior Publication Data
US 2021/0258398 A1    Aug. 19, 2021

(51) Int. Cl.
H04L 67/568    (2022.01)
H04L 43/16    (2022.01)
H04L 67/10    (2022.01)
H04L 47/28    (2022.01)
H04L 67/63    (2022.01)

(52) U.S. Cl.
CPC ............ *H04L 67/568* (2022.05); *H04L 43/16* (2013.01); *H04L 47/286* (2013.01); *H04L 67/10* (2013.01); *H04L 67/63* (2022.05)

(58) Field of Classification Search
CPC ... H04L 67/2842; H04L 67/10; H04L 67/327; H04L 43/16; H04L 47/286
USPC ................................................ 709/213, 217
See application file for complete search history.

(56) References Cited

U.S. PATENT DOCUMENTS

| | | | |
|---|---|---|---|
| 9,276,978 B2 | 3/2016 | Takahashi | |
| 10,135,899 B1* | 11/2018 | Nielsen | H04L 65/605 |
| 10,812,846 B1* | 10/2020 | Vantalon | H04N 21/2408 |
| 2006/0064500 A1 | 3/2006 | Roth et al. | |
| 2012/0131095 A1* | 5/2012 | Luna | H04L 67/2833 709/224 |
| 2013/0073809 A1* | 3/2013 | Antani | G06F 12/121 711/136 |

(Continued)

OTHER PUBLICATIONS

Kim, Namtae, Dongho You, Eun Young Jeong, Bong-seok Seo, Dong Ho Kim, and Ye Hoon Lee. "An adaptive TTL allocation scheme for real-time live and on-demand personal broadcasting service." In 2017 IEEE 7th International Conference on Consumer Electronics-Berlin (ICCE-Berlin), pp. 51-52. IEEE, 2017. (Year: 2017).*

(Continued)

*Primary Examiner* — Glenford J Madamba
(74) *Attorney, Agent, or Firm* — Ballard Spahr LLP

(57) ABSTRACT

Methods and systems for cache optimization are described. Content items served to client devices of a content distribution network may be associated with a cache value. The cache value for a content item may cause a cache device to cache the content item for a period of time. The cache value for the content item may be updated based on increasing or decreasing popularity. The content item may be encoded at a plurality of bitrates, and cache values may vary across the plurality of bitrates such that multiple copies of the content item may each be cached for varying periods of time depending on a corresponding bitrate.

20 Claims, 10 Drawing Sheets

| Asset ID (302) | Manifest (304) | Content (306) | Time Window (308) | Type (310) | Expiration (312) | Bitrate (314) | Cache Location (316) |
|---|---|---|---|---|---|---|---|
| 1 | max-age=3600 | max-age=3600 | ANY | Short form (unpopular) | NULL | NULL | Mid-Tier |
| 7 | max-age=86400 | max-age=86400 | ANY | Ad (popular) | NULL | NULL | Mid-Tier |
| 16 | max-age=3600 | max-age=3600 | 00:00:00 – 13:00:59 | Series (highly popular) | 13:00:59 | NULL | Edge |
| 16 | max-age=1440 | max-age=14400 | 13:01:00 – 23:59:59 | Series (highly popular) | 23:59:59 | NULL | Edge |
| 22 | max-age=900 | max-age=3600 | ANY | Series (highly popular) | NULL | HIGH | Mid-Tier |
| 22 | max-age=14400 | max-age=14400 | 17:00:00 – 23:59:59 | Series (highly popular) | 23:59:59 | MEDIUM/LOW | Edge |

(56) References Cited

U.S. PATENT DOCUMENTS

| | | | |
|---|---|---|---|
| 2013/0166625 A1* | 6/2013 | Swaminathan | H04N 21/4532 709/203 |
| 2015/0319261 A1* | 11/2015 | Lonas | G06F 12/0875 709/216 |
| 2016/0248866 A1* | 8/2016 | Garas | H04L 67/2842 |
| 2016/0378666 A1* | 12/2016 | Amrhein | G06F 3/0613 709/213 |
| 2018/0097864 A1* | 4/2018 | Brinkley | H04N 21/23424 |
| 2019/0281129 A1* | 9/2019 | Menai | H04L 43/0876 |

OTHER PUBLICATIONS

Basu, Soumya, Aditya Sundarrajan, Javad Ghaderi, Sanjay Shakkottai, and Ramesh Sitaraman. "Adaptive TTL-based caching for content delivery." IEEE/ACM transactions on networking 26, No. 3 (2018): 1063-1077. (Year: 2018).*

* cited by examiner

FIG. 3

| Asset ID ~302 | Manifest ~304 | Content ~306 | Time Window ~308 | Type ~310 | Expiration ~312 | Bitrate ~314 | Cache Location ~316 |
|---|---|---|---|---|---|---|---|
| 1 | max-age=3600 | max-age=3600 | ANY | Short form [unpopular] | NULL | NULL | Mid-Tier |
| 7 | max-age=86400 | max-age=86400 | ANY | Ad [popular] | NULL | NULL | Mid-Tier |
| 16 | max-age=3600 | max-age=3600 | 00:00:00 – 13:00:59 | Series [highly popular] | 13:00:59 | NULL | Edge |
| 16 | max-age=1440 | max-age=14400 | 13:01:00 – 23:59:59 | Series [highly popular] | 23:59:59 | NULL | Edge |
| 22 | max-age=900 | max-age=3600 | ANY | Series [highly popular] | NULL | HIGH | Mid-Tier |
| 22 | max-age=14400 | max-age=14400 | 17:00:00 – 23:59:59 | Series [highly popular] | 23:59:59 | MEDIUM/LOW | Edge |

METHODS AND SYSTEMS FOR CACHE OPTIMIZATION

BACKGROUND

A content distribution network ("CDN") may store content items, such as shows or programs that were previously broadcast, in one or more cache devices for a period of time to allow client devices to consume the content items at a later time on-demand (e.g., video-on-demand "VOD"). The content items may be associated with a cache value that causes the one or more cache devices to store a content item for a period of time; however, the cache value is not updated when the content item becomes more, or less, popular. Additionally, the content item may be encoded at a number of bitrates, and the cache value may be the same across all of the bitrates. These existing uses of cache values, which are static in nature, may affect user experience due to latency and other processing issues. These and other considerations are addressed by the present description.

SUMMARY

It is to be understood that both the following general description and the following detailed description are exemplary and explanatory only and are not restrictive. Methods and systems for cache optimization are described. Content items served to client devices of a content distribution network ("CDN") may be associated with a cache value to allow the CDN to efficiently and effectively cache the content items. The cache value may be used by the CDN to determine how long a content item should be stored (e.g., cached). The cache value may be stored in cache control metadata, a header field, or any other portion of a content item. When a content item is requested by a client device, the request may be sent to a cache device for fulfillment. In some cases, the cache device may not have the requested content item stored locally, and the cache device may then forward the request to a packaging device in communication with an origin server. The packaging device may receive the requested content item from the origin server and then send the requested content item downstream to the cache device, which may, in turn, send the content item to the client device.

In order to provide more efficient cache control, the cache value for a content item may be associated with a time-to-live (TTL) element that may be updated based on changing popularity of the content item. The TTL element may cause each cache device to cache the content item for a first period of time. As the content item becomes more popular, the TTL element may be updated such that the updated TTL element may cause each cache device to cache the content item for a second period of time, which may be a longer duration than the first period of time. As the content item becomes less popular, the TTL element may be updated such that the updated TTL element may cause each cache device to cache the content item for a third period of time, which may be a shorter duration as compared to the second period of time and the first period of time.

The content item may be encoded at a plurality of bitrates, and cache values may vary across the plurality of bitrates such that multiple copies of the content item may each be cached for varying periods of time depending on a corresponding bitrate. Copies of the content item encoded at a higher level bitrate may be stored for less time as compared to copies of the content item encoded at a lower level bitrate. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein:

FIG. 3 shows an example table of cache values.

DETAILED DESCRIPTION

Figure 1:
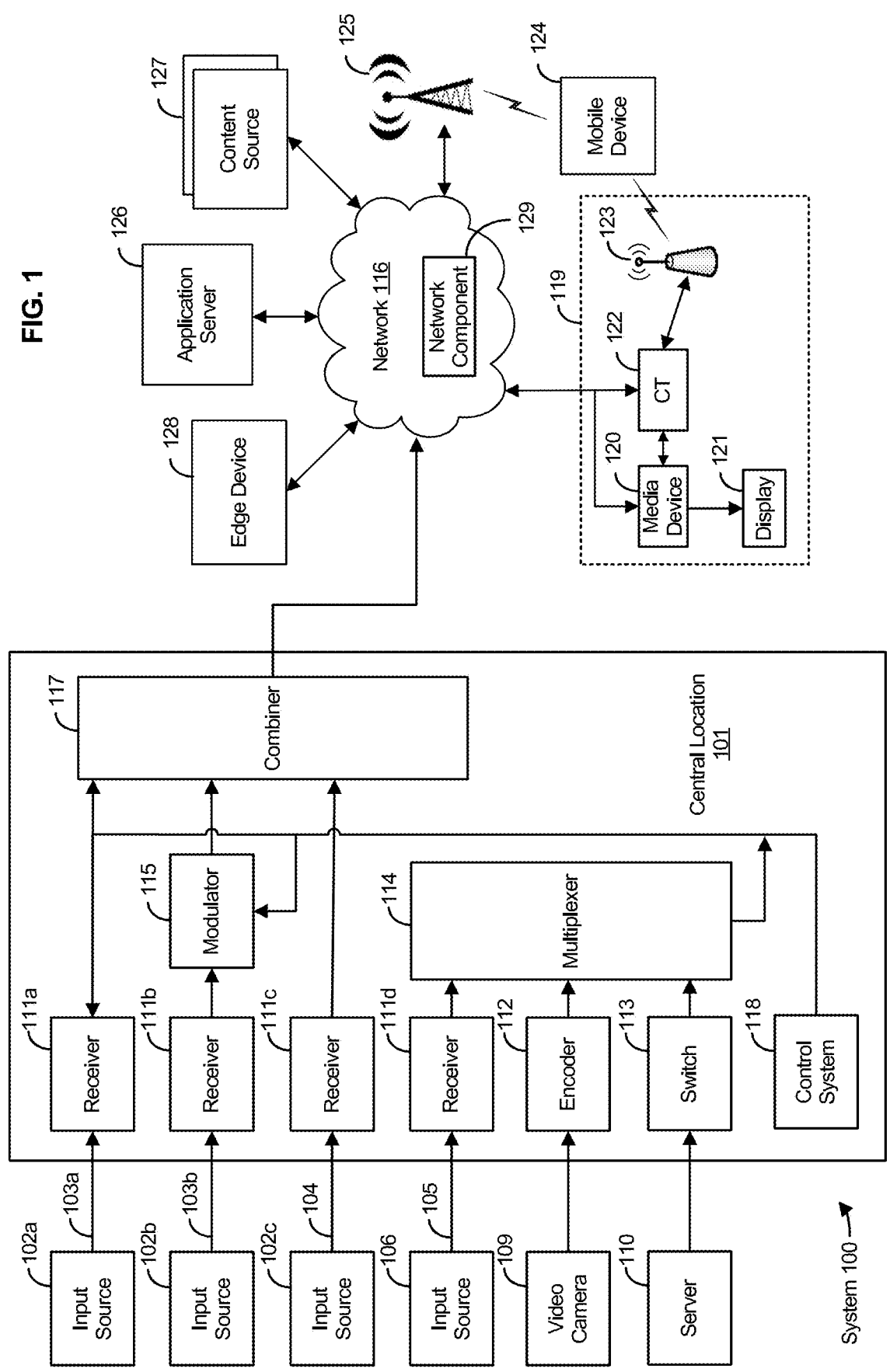
FIG. 1 shows an example system for delivering content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, 8k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "sending" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Described herein are methods and systems for cache optimization. Content items served to client devices of a content distribution network ("CDN") may be associated with a cache value to allow the CDN to efficiently cache (e.g., store) the content items. The cache value may be used by the CDN to determine how long a content item should be stored (e.g., cached). The cache value may be stored in cache control metadata, a header field, or any other portion of a content item. The cache value may be generated by an origin server, a packaging device and/or a cache optimizer service of the CDN. The cache value may be sent with a content item to one or more cache devices of the CDN, such as a mid-tier cache, and edge cache, etc. The cache device may store the content item as well as the associated cache value for the content item in memory. The cache value may indicate a time-to-live (TTL) element, after which the cache device may delete the content item. The cache value may specify a default duration for the TTL element such as, for example, 10,000 seconds. When a content item is requested by a client device, the request may be sent to an edge cache device for fulfillment. In some cases, the edge cache may not have the requested content item stored locally. The edge cache may then forward the request to a mid-tier cache, which may also determine that the content item is not stored locally. The mid-tier cache may then forward the request to a packaging device in communication with an origin server. The packaging device may receive the requested content item from the origin server and then send the requested content item downstream to the client device via the mid-tier cache and the edge cache. In such a scenario, where a request for a content item is required to be fulfilled by a packaging device, latency and other user experience issues may manifest as a result. This is especially true for popular content items.

In order to provide more efficient cache control, the cache value for a content item may be updated based on popularity of the content item. The TTL element may cause each of the edge cache and the mid-tier cache, or any other caching device of the CDN, to cache the content item for a period of time associated with the TTL element. In this way, requests for popular content items may be more quickly and efficiently fulfilled by the CDN. Additionally, some content items may be efficiently removed from caching devices as they become less popular, rather than using a static TTL for all content items regardless of popularity. The TTL element for a content item may be dynamic, changing as the popularity of the content item increases or decreases.

The CDN may provide content items at varying levels of quality using an adaptive bitrate regime. A content item may be encoded at a plurality of bitrates, and cache values may vary across the plurality of bitrates. For example, a first portion of a content item may be encoded at a lower bitrate as compared to a subsequent second portion of the content item, which may be encoded at a medium or high bitrate. The cache value for the first portion may be associated with a first TTL element that causes the cache devices of the CDN to cache the first portion for a first duration of time—after which it may be removed from memory. The cache value for the second portion may be associated with a second TTL element that causes the cache devices of the CDN to cache the second portion for a second duration of time, which may be less than the first duration of time. In this way, the CDN may quickly and efficiently fulfill multiple requests for the content item by providing all requesting client devices with the first portion encoded at the lower bitrate. As the requesting client devices ramp-up (e.g., determine that a higher bitrate can be processed), the CDN may provide some, or all, of the requesting client devices with the second portion encoded at the higher bitrate.

As another example, a portion of the content item may be encoded at a plurality of bitrates, and cache values may vary across the plurality of bitrates. For example, the portion of the content item may be encoded at a low bitrate, a medium bitrate, and a high bitrate. The cache value for the portion encoded at a low bitrate may be associated with a TTL element that causes the cache devices of the CDN to cache the portion encoded at the low bitrate for a first duration of time—after which it may be removed from memory. The cache value for the portion encoded at the medium bitrate may be associated with a TTL element that causes the cache devices of the CDN to cache the portion encoded at the medium bitrate for a second duration of time, which may be less than the first duration of time. The cache value for the portion encoded at the high bitrate may be associated with a TTL element that causes the cache devices of the CDN to cache the portion encoded at the high bitrate for a third duration of time, which may be less than the first duration of time and/or the second duration of time. In this way, the CDN may quickly and efficiently fulfill multiple requests for the content item varying levels of quality (e.g., varying bitrates) by providing the portion of the content item at a requested bitrate (e.g., low, medium, or high). The TTL element may be adjusted as popularity changes and as patterns of requests for the portion of the content item change. For example, a majority of devices may request the portion at the high bitrate, thereby indicating the TTL element for the portion encoded at the high bitrate should be adjusted to a longer duration. Any TTL element may be adjusted algorithmically or manually. For example, the CDN may adjust a TTL element when a number of requests for a content item over a period of time satisfy a threshold. As another example, a TTL element may be adjusted manually by an administrator of a CDN when a content item is anticipated as becoming highly popular. Further, a content item may be associated with a plurality of TTL elements that are each associated with a window of time (e.g., a timeframe of a time). Each of the plurality of TTL elements may be adjusted such that the content item may be cached for varying amounts of time across a time period (e.g., less time during daytime viewing hours and greater time during primetime viewing hours).

FIG. 1 shows a system 100 for content delivery. Those skilled in the art will appreciate that digital equipment and/or analog equipment may be employed. One skilled in the art will appreciate that provided herein is a functional description and that the respective functions may be performed by software, hardware, or a combination of software and hardware. The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

The central location 101 may receive content from a variety of sources 102a, 102b, and 102c. The content may be sent from any of the sources 102a, 102b, or 102c to the central location 101 via a variety of transmission paths, including wireless paths (e.g., satellite paths 103a, 103b) and terrestrial paths 104. The central location 101 may also receive content from input 106, such as a direct feed source, via a direct line 105 (e.g., one or more communication links and/or one or more communication paths). Other input sources may be capture devices such as a video camera 109 or a server 110. The content sent by the content sources may comprise a single content item, a portion of a content item (e.g., content fragment), a content stream, a multiplex that includes several content items, and/or the like. The content item may be an advertisement.

The central location 101 may have one or a plurality of receivers 111a, 111b, 111c, 111d that are associated with one or more corresponding input sources. The central location 101 may include one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from a video camera 109 and/or other source and apply one or more encoding algorithms to the received content. A switch 113 may provide access to a server 110, which may be a Pay-Per-View server, a data server, an internet router, a network system, a phone system, and the like. Some signals may require additional processing, such as signal multiplexing, prior to being modulated. Such multiplexing may be performed by a multiplexer 114.

The central location 101 may include one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116.

The network 116, and the system 100 generally, may be a content distribution network, a content access network, and/or the like. The network 116 may be configured to send content from a variety of sources using a variety of network paths, protocols, devices, and/or the like. The network 116 may be managed (e.g., deployed, serviced) by a content provider, a service provider, and/or the like. The network 116 may have a plurality of communication links connecting a plurality of devices.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 ("CT") (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park, etc.).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to send data, handle requests, and/or otherwise facilitate operation of applications for the user.

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like. The network 116 may have a network component 129. The network component 129 may be any device, module, and/or the like communicatively coupled to the network 116.

The network component 129 may be a router, a switch, a splitter, a packager, a gateway, an encoder, a storage device, a multiplexer, a network access location (e.g., tap), physical link, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to receive packaged content (e.g., from the central location 101 and/or any of the sources 102a, 102b, or 102c) for delivery to the user, convert content for delivery to the user (e.g., in a specific format requested by a user device), send the user a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to users.

The edge device 128 may receive a request for content from the user location 119. The edge device 128 may receive a request for content from a client device (e.g., the media device 120, the communication terminal 122, etc.). The edge device 128 may establish a communication link with the client device. The edge device 128 may determine whether the edge device 128 has access to the requested content. The edge device 128 may determine whether the edge device 128 has access to the requested content (e.g., stored in local memory of the edge device 128) after receiving the request for content from the client device. The edge device 128 may determine whether another cache associated with the edge device 128 has the requested content (e.g., a mid-tier cache, such as the central location 101). If the edge device 128 does not have access to the requested content and/or if the other cache does not have the requested content, as the case may be, the edge device 128 may request the requested content from the central location 101, a different edge device 128 and/or the content source 127.

The edge device 128 may establish a communication link with the central location 101, a different edge device 128 and/or the content source 127 to receive the requested content. The edge device 128 may track the content received from the central location 101, a different edge device 128 and/or the content source 127. The control system 118 may determine that the central location 101 does not have access to the requested content. The control system 118 may establish a communication link with input source 102a (e.g., based on the request for the content). The input source 102a may send a redirect message to the control system 118 indicating that the requested content is available from an input source, such as, for example, input source 102b. The central location may receive the requested content from input source 102b and provide the requested content to the edge device 128 for delivery to the user.

Content items served to users of the network 116 may be associated with a cache value to enable the system 100 to efficiently and effectively cache content items. The cache value may be used by the system 100 to determine how long a content item should be stored (e.g., cached). The cache value may be stored in cache control metadata, a header field, or any other portion of a content item. For example, the cache value may be stored as HTML headers appended to packets of data for portions of a content item. The cache value may be generated by an origin server, such as the input source 102a or the content source 127; a packaging device, such as the combiner 117; and/or a cache optimizer service resident on a of the device of the central location 101, such as the control system 118. The cache value may be sent with a content item to one or more cache devices, such as the edge cache 128. The cache device may store the content item as well as the associated cache value for the content item in memory. The cache value may enable the system 100 to efficiently cache (e.g., store) the content items (e.g., at the edge cache 128). The cache value for a portion of a content item, such as a first segment of the content item, may be associated with a time-to-live (TTL) element that may be updated based on popularity of the content item. The TTL element may cause the edge cache 128, or any other caching device of the network 116, to cache the portion of the content item for a period of time associated with the TTL element. The TTL element may be dynamic and change as the popularity of the content item increases or decreases. For example, the TTL element may be associated with a numerical value representing a duration of time (e.g., seconds, minutes, hours, etc.)—after which the portion of the content item may be removed from memory. When the content item is determined to be highly popular by the system 100, the value of the TTL element may be increased to a longer duration of time (e.g., after the current value of the TTL element expires). When the content item is determined to be less popular by the system 100, the value of the TTL element may be decreased to a shorter duration of time (e.g., after the current value of the TTL element expires).

Determining the popularity of the content item may be based on a number of requests for the content item over a period of time satisfying a threshold. For example, the content item may initially be determined to be less popular overall at a first time point. A plurality of requests for the content item may be received during a defined period of time (e.g., 2 hours, etc.) ending at a second time point. The plurality of requests may satisfy (e.g., meet or exceed) the threshold (e.g., 200 additional requests are received within a 2 hour timeframe). The content item may then be determined to be more popular at the second time point as compared to the first time point. The TTL element for the content item may then be adjusted/updated to reflect a longer duration of time, such as 3,000 additional seconds, that the content item is to be cached at a cache device.

As another example, determining the popularity of the content item may be based on a number of social media posts made over a period of time satisfying a threshold. For example, the content item may initially be determined to be less popular overall at a first time point based on an initially low number of social media posts that mention (e.g., refer to) the content item at the first time point. A plurality of additional social media posts that mention the content item may be made (e.g., observed, counted, etc.) during a defined period of time (e.g., 2 hours, etc.) ending at a second time point. The plurality of additional social media posts may satisfy (e.g., meet or exceed) the threshold (e.g., 200 additional social media posts are made within a 2 hour timeframe). The content item may then be determined to be more popular at the second time point as compared to the first time point. The TTL element for the content item may then be adjusted/updated to reflect a longer duration of time, such as 3,000 additional seconds, that the content item is to be cached at a cache device.

The network 116 may provide content items at varying levels of quality using an adaptive bitrate regime. A content item may be encoded at a plurality of bitrates, and cache values may vary across the plurality of bitrates. For example, a first portion of a content item may be encoded at a lower bitrate as compared to a subsequent second portion of the content item, which may be encoded at a medium or high bitrate. The cache value for the first portion may be associated with a first TTL element that causes the edge cache 128, or any other caching device of the network 116, to cache the first portion for a first duration of time—after which it may be removed from memory. The cache value for the second portion may be associated with a second TTL element that causes the edge cache 128, or any other caching device of the network 116, to cache the second portion for a second duration of time, which may be less than the first duration of time. In this way, the network 116 may quickly and efficiently fulfill multiple requests for the content item by providing all requesting client devices, such as the media device 120, with the first portion encoded at the lower bitrate. As the requesting client devices ramp-up (e.g., determine that a higher bitrate can be processed), the network 116 may provide some, or all, of the requesting client devices with the second portion encoded at the higher bitrate.

As another example, a portion of the content item may be encoded at a plurality of bitrates, and cache value may vary across the plurality of bitrates. For example, the portion of the content item may be encoded at a low bitrate, a medium bitrate, and a high bitrate. The cache value for the portion encoded at a low bitrate may be associated with a TTL element that causes the edge cache 128, or any other caching device of the system 100, to cache the portion encoded at the low bitrate for a first duration of time—after which it may be removed from memory. The cache value for the portion encoded at the medium bitrate may be associated with a TTL element that causes the edge cache 128, or any other caching device of the system 100, to cache the portion encoded at the medium bitrate for a second duration of time, which may be less than the first duration of time. The cache value for the portion encoded at the high bitrate may be associated with a TTL element that causes the edge cache 128, or any other caching device of the system 100, to cache the portion encoded at the high bitrate for a third duration of time, which may be less than the first duration of time and/or the second duration of time. In this way, the network 116 may quickly and efficiently fulfill multiple requests for the content item varying levels of quality (e.g., varying bitrates) by providing the portion of the content item at a requested bitrate (e.g., low, medium, or high). The TTL element may be adjusted as popularity changes and as patterns of requests for the portion of the content item change. For example, a majority of devices may request the portion at the high bitrate, thereby indicating the TTL element for the portion encoded at the high bitrate should be adjusted to a longer duration.

Figure 2:
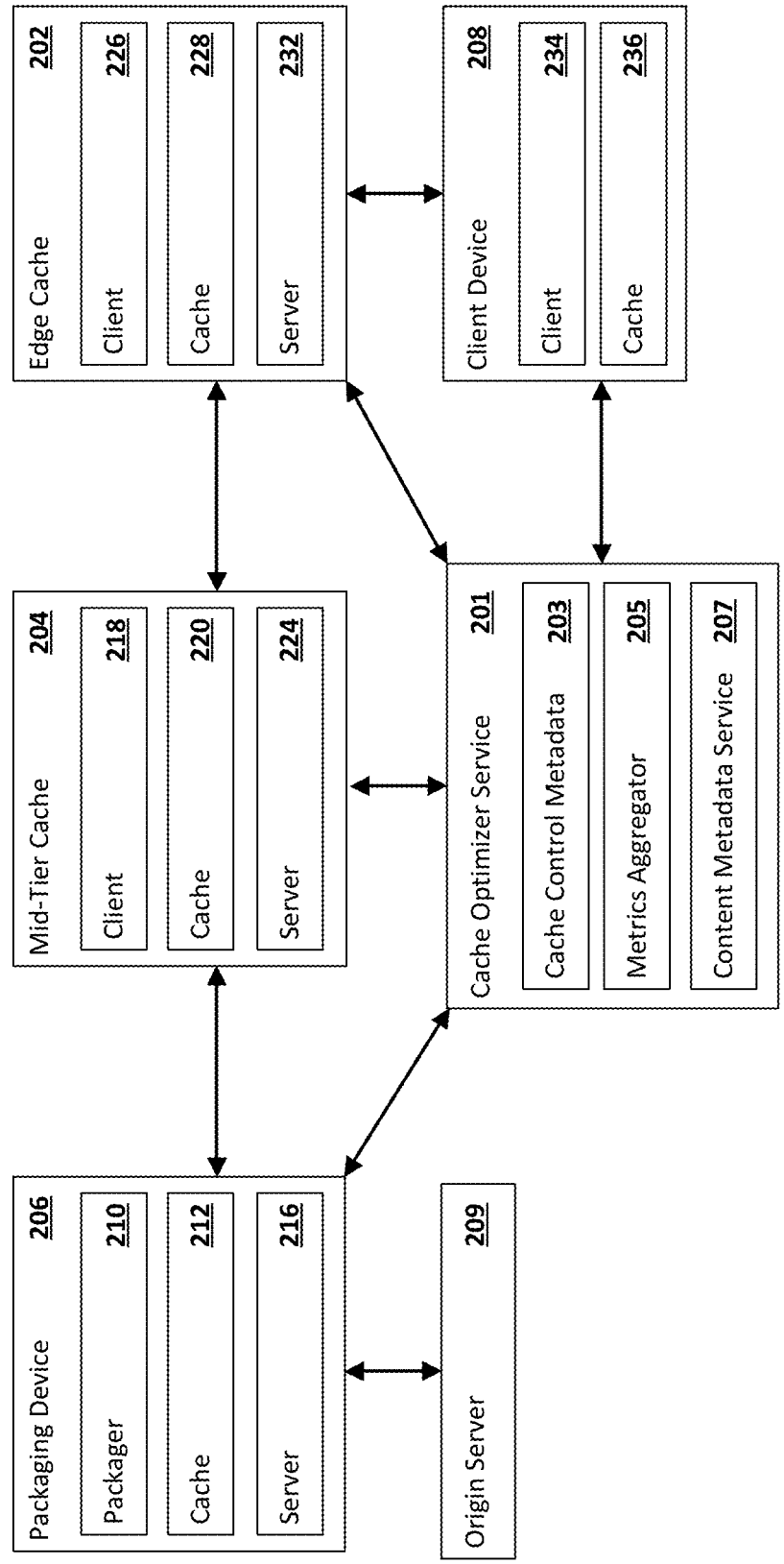
FIG. 2 shows an example system for cache optimization.

FIG. 2 shows a system 200. The system 200 may have an origin server 209 and a packaging device 206. The packaging device 206 may receive a requested content item from the origin server 209 and then send the requested content item downstream to an edge cache 202 and/or a mid-tier cache 204, which may, in turn, send the content item to a client device 208. The system 200 may have a cache optimizer service 201 that may be configured to generate a cache value associated with a content item. While not shown for ease of explanation, a person skilled in the art would appreciate that the system 200 may have any number of origin servers 209, packaging devices 206, mid-tier caches 204, edge caches 202, cache optimizer services 201, and client devices 208.

The packaging device 206 may have a packager module 210, a cache 212, and a server module 216. The packaging device 206 may receive content from the origin server 209 and package the received content (e.g., using the packager module 210) to send the content to another device (e.g., the mid-tier cache 204). The packaging device 206 may store the received content in the cache 212. The packaging device 206 may also store packaged content ready to be sent to another device in the cache 212. The cache 212 may also remove content after the effective life of the content is ended. The cache 212 may remove content based on a time-to-live ("TTL") element associated with a cache value corresponding to the content. For example, a content item may be associated with a cache value having a TTL element indicative of 5,000 seconds. The TTL element may cause the cache 212 to cache (e.g., store) the content item in memory for 5,000 seconds, which may be begin to elapse (e.g., count down) after the content item is first received at the cache 212. As the 5,000 seconds elapses, the cache 212 may receive an additional request for the content item. The receipt of the additional request may cause the cache 212 to renew the TTL element for the content item (e.g., restart counting down from 5,000). For example, the receipt of the additional request may cause the cache 212 to renew the TTL element for the content item after a current value of the TTL element expires. After the 5,000 seconds has fully elapsed without a further request for the content item being received, the cache 212 may delete the content item (e.g., remove the content item from memory).

The server module 216 may be configured to communicate with another device. The server module 216 may communicate with the mid-tier cache 204, as well as send the mid-tier cache 204 content. The server module 216 may be configured to handle communications from the packaging device 206 to the mid-tier cache 204. Specifically, the server module 216 may open and/or create a communication link to communicate with the mid-tier cache 204. The server module 216 may send content to the mid-tier cache tier 204 via the opened/created communication link. After the communication link is established, the server module 216 may send a plurality of content fragments to the requesting device (e.g., the mid-tier cache 204).

The mid-tier cache 204 may have a client module 218, a cache 220, and a server module 224. The mid-tier cache 204 may receive content and store the received content in the cache 220. The server 224 may communicate with another device. The server 224 may communicate with the packaging device 206 and/or the edge cache device 202. The mid-tier cache 204 may receive content from the packaging device 206. The mid-tier cache 204 may also send content to the edge cache 202. The mid-tier cache 204 may send content to the edge cache 202 as the content becomes available. That is, when the mid-tier cache 204 receives content from the origin server 209 via the packaging device 206, the mid-tier cache 204 may send the content to the edge cache 202.

The cache 220 may store content. The cache 220 may store content received from the packaging device 206, as well as content for distributing to the edge cache 202. The content stored for distributing to the edge cache 202 may be stored with a cache value. The cache 220 may also update content stored within the cache 220 based on the received content. The cache 220 may also remove content after the effective life of the content is ended. The cache 220 may remove content based on a time-to-live element associated with a cache value corresponding to the content.

The client module 218 may communicate with another device. The client module 218 may communicate with the packaging device 206. The client module 218 may establish a communication link with the packaging device 206 in order to receive content from the packaging device 206. The client module 218 may request content that is not in the cache 220. The mid-tier cache 204 may receive a request for content (e.g., from the edge cache 202), and may determine that the cache 220 does not have the requested content. Thus, the client module 218 establishes the communication link with the packaging device 206 to request the missing content. Once the mid-tier cache 204 receives the missing content, the client module 218 may send the content to the requesting device (e.g., the edge cache 202).

The server module 224 may be configured to communicate with another device. The server module 224 may communicate with the edge cache 202, as well as send the edge cache 202 content. The server module 224 may be configured to handle communications for the mid-tier cache 204 to the edge cache 202. Specifically, the server module 224 may open and/or create a communication link to communicate with the edge cache 202. The server module 224 may send content to the edge cache 202 via the opened/created communication link. After the communication link is established, the server module 224 may send a plurality of content fragments to the requesting device (e.g., the edge cache 202).

The edge cache 202 may have a client 226, a cache 228, and a server 232. The edge cache 202 may receive content and store the received content in the cache 228. The cache 228 may store content. The cache 228 may store content received from the mid-tier cache 204, as well as content for distributing to the client device 208. The cache 228 may also update a cache value stored within the cache 228 and associated with the stored content. The cache 228 may also remove content after the effective life of the content is ended. The cache 228 may remove content based on a time-to-live element associated with a cache value corresponding to the content.

The client module 226 may communicate with another device, such as the mid-tier cache 204. The client module 226 may establish a communication link with the mid-tier cache 204 in order to receive content from the mid-tier cache 204. The client module 226 may request content that is not in the cache 228. The edge cache 202 may receive a request for content (e.g., from the client device 208), and may determine that the cache 228 does not have the requested content. Thus, the client module 226 establishes the communication link with the mid-tier cache 204 to request the missing content. Once the edge cache 202 receives the missing content, the client module 226 may send the content to the requesting device (e.g., the client device 208).

The server module 232 may be configured to communicate with another device. The server module 232 may communicate with the client device 208, as well as provide the client device 208 with content. The server module 232 may be configured to handle communications for the edge cache 202 to the client device 208. Specifically, the server module 232 may open and/or create a communication link to communicate with the client device 208. The server module 232 may send content to the client device 208 via the opened/created communication link. After the communication link is established, the server module 232 may send a plurality of content fragments to the requesting device (e.g., the client device 208).

The client device 208 may have a client module 234 and a cache 236. The cache 236 may store content. The cache 236 may store content received from the edge cache 202. The cache 236 may also update a cache value stored within the cache 236 and associated with the stored content. The cache 236 may also remove content after the effective life of the content is ended. The cache 236 may remove content based on a time-to-live element associated with a cache value corresponding to the content.

The client module 234 may communicate with another device. The client module 234 may communicate with the edge cache 202. The client module 234 may establish a communication link with the edge cache 202 in order to receive content from the edge cache 202. The client module 234 may request content that is not in the cache 236. The client device 208 may receive a request for content (e.g., from a user of the client device 208), and may determine that the cache 236 does not have the requested content. Thus, the client module 234 establishes the communication link with the edge cache 202 to request the missing content. After requesting the content from the edge cache 202, the edge cache 202 may in turn create a communication link with the mid-tier cache 204. Thus, the client device 208 requesting content may result in the edge cache 202 requesting content to fulfill the request. Stated differently, a downstream device (e.g., the client device 208) may cause an upstream device (e.g., the edge cache 202, the mid-tier cache 204, and/or the packaging device 206) to create one or more communication links to facilitate completion of the request. Once the client device 208 receives the missing content, the client module 234 may display the content (e.g., on a display device).

The cache optimizer service 201 may have a cache control module 203, a metrics aggregator module 205, and a content metadata service module 207. The cache optimizer service 201 may be in communication with one or more user devices, such as the client device 208, located across a geographic region (e.g., a neighborhood, city, county, state, country region, country overall, etc.) The metrics aggregator module 205 may keep track of a number of user devices that request a content item. The metrics aggregator module 205 may receive metadata associated with a requested content item, such as content type (e.g., short form, series, etc.) as well as any associated manual scheduling of cache control, from the content metadata service module 207. As the cache optimizer service 201 may be in communication with the one or more user devices, the metrics aggregator module 205 may receive data indicative of the number of user devices that request the content item as well as the metadata associated with the requested content item from the one or more user devices via the cache optimizer service 201. For example, a manual scheduling of cache control may indicate that a highly popular content item is to be cached at one or more of the cache 220, the cache 228, or the cache 212 for a specified period of time (e.g., as determined by an administrator or other device). The metrics aggregator module 205 may generate a cache value associated with a requested content item. For example, the packaging device 206 may generate video fragments, such as portions of a requested content item, for distribution through the mid-tier cache 204, the edge cache 202, and/or the client device 208. The requested content item may have originally been streamed live by a live media source, and the portions of the requested content item may be generated based on a video-on-demand request received by the mid-tier cache 204, the edge cache 202, and/or the packaging device 206. The metrics aggregator module 205 may generate a cache value associated with each portion of the requested content item. The metrics aggregator module 205 may cause one or more of the mid-tier cache 204, the edge cache 202, or the client device

208 to attach/associate the cache value as an HTML header for a respective/corresponding portion of the requested content item (e.g., each portion of the requested content item may have its own respective/corresponding cache value and HTML header).

The cache value may be continuously updated by the metrics aggregator module 205 as the requested content item becomes more or less popular. For example, the content metadata service module 207 may retrieve/determine program or service level information associated with a requested content item (or portion thereof). The program or service level information may be stored on a database in communication with the cache optimizer service 201. The program or service level information may be part of a manifest file received from one or more of the mid-tier cache 204, the edge cache 202, or the client device 208 when the content item is requested. The program level information may identify a content item as a television show, a movie, a concert, etc. Service level information may identify a source of the content item, such as a television station, a producer, a venue, etc. Using the program and/or service level information, the content metadata service module 207 may determine popularity or demographic information associated with the requested content item. Popularity may be determined based on a rating of a popularity scale(s). For example, a popularity scale may be defined and popularity data may be generated (e.g., by the control system 118) based on popularity information associated with the requested content item. A popularity rating for a television series may be generated and used as the popularity data when a particular episode from the series is requested. Popularity data may also be organized at the service level. For example, popularity data may be provided for different stations, broadcasters, or other live media sources. Popularity data may further include popularity information for actors, musicians, or other content that may be associated with a particular content item.

Demographic data may include geographic or other demographic data associated with a user(s) of the client device 208. For example, information relating to popularity of content items by geographic area may be included. Demographic data may include popularity information divided into geographic and other groupings of users in other examples. The content metadata service module 207 may retrieve/determine program or service level information associated with the requested content item (or portion thereof) on a periodic basis. Accordingly, the cache value may be updated dynamically (e.g., in real-time) by the metrics aggregator module 205 as the requested content item becomes more or less popular, based on the determined/retrieved popularity and demographic information associated with the requested content item. When dynamically updating the cache value, the metrics aggregator module 205 may accord more weight to recently determined/retrieved popularity and demographic information associated with the requested content item as opposed to dated popularity and demographic information (e.g., determined/retrieved at a prior time). In this way, the metrics aggregator module 205 may update the cache value to bias toward current popularity trends rather than past trends. For example, a content item from several years ago that was once popular, but whose popularity has trended downward with time, may become highly popular once again, and the metrics aggregator module 205 may account for such renewed popularity by updating the cache value to bias toward the current popularity trends.

A cache value generated by the metrics aggregator module 205 may be associated with a time-to-live (TTL) element that may be updated based on the retrieved/determined program or service level information associated with a requested content item. The TTL element may cause each of the cache 220, the cache 228, or the cache 212, or any other caching device, to cache a requested content item (or a portion thereof) for a period of time associated with the TTL element. The TTL element for a requested content item may be dynamic and change as the popularity of the content item increases or decreases. Determining the popularity of the content item may be based on a number of requests for the content item over a period of time satisfying a threshold. For example, the requested content item may initially be determined to be less popular overall at a first time point. A plurality of requests for the content item may be received during a defined period of time (e.g., 2 hours, etc.) ending at a second time point. The plurality of requests may satisfy (e.g., meet or exceed) the threshold (e.g., 200 additional requests are received within a 2 hour timeframe). The content item may then be determined to be more popular at the second time point as compared to the first time point.

The TTL element for a requested content item may enable efficient caching of less popular content. For example, a more recent but less popular content item may benefit from being cached for a longer duration as compared to more popular, but older, content items in some situations. More recently released content items (e.g., newer content items) that are associated with a less popular television series may nevertheless be requested more often than more popular, but older, content items for a certain period of time after the more recently released content items first become available (e.g., a number of days or weeks following a release of a new episode of a television show).

A cache value associated with a requested content item may be generated by the metrics aggregator module 205 for each caching device that caches the requested content item. For example, a TTL element associated with a cache value generated by the metrics aggregator module 205 for the edge cache 202 may have a higher numerical value representing a higher duration of time (e.g., seconds, minutes, hours, etc.) as compared to a TTL element associated with a cache value generated by the metrics aggregator module 205 for the mid-tier cache 204. In this way, more popular content items may be stored/cached for longer durations of time at a caching device(s) that is closest geographically to the client device 208.

A content item may be encoded at a plurality of bitrates, and cache values may vary across the plurality of bitrates. For example, a first portion of a content item may be encoded at a lower bitrate as compared to a subsequent second portion of the content item, which may be encoded at a medium or high bitrate. The cache value generated by the metrics aggregator module 205 for the first portion may be associated with a first TTL element that causes one or more of the packaging device 206, the mid-tier cache 204, the edge cache 202, or the client device 208 to cache the first portion for a first duration of time—after which it may be removed from memory. The cache value generated by the metrics aggregator module 205 for the second portion may be associated with a second TTL element that causes one or more of the packaging device 206, the mid-tier cache 204, the edge cache 202, or the client device 208 to cache the second portion for a second duration of time, which may be less than the first duration of time. In this way, some portions of a content item encoded at a lower bitrate may be cached for longer than other portions of the content item.

As another example, a portion of the content item may be encoded at a plurality of bitrates, and cache values may vary across the plurality of bitrates. For example, the portion of the content item may be encoded at a low bitrate, a medium bitrate, and a high bitrate. The cache value generated by the metrics aggregator module 205 for the portion encoded at a low bitrate may be associated with a TTL element that causes one or more of the packaging device 206, the mid-tier cache 204, the edge cache 202, or the client device 208 to cache the portion encoded at the low bitrate for a first duration of time—after which it may be removed from memory. The cache value generated by the metrics aggregator module 205 for the portion encoded at the medium bitrate may be associated with a TTL element that causes one or more of the packaging device 206, the mid-tier cache 204, the edge cache 202, or the client device 208 to cache the portion encoded at the medium bitrate for a second duration of time, which may be less than the first duration of time. The cache value generated by the metrics aggregator module 205 for the portion encoded at the high bitrate may be associated with a TTL element that causes one or more of the packaging device 206, the mid-tier cache 204, the edge cache 202, or the client device 208 to cache the portion encoded at the high bitrate for a third duration of time, which may be less than the first duration of time and/or the second duration of time. In this way, the CDN may quickly and efficiently fulfill multiple requests for the content item varying levels of quality (e.g., varying bitrates) by providing the portion of the content item at a requested bitrate (e.g., low, medium, or high). The TTL element may be adjusted as popularity changes and as patterns of requests for the portion of the content item change. For example, a majority of devices may request the portion at the high bitrate, thereby indicating the TTL element for the portion encoded at the high bitrate should be adjusted to a longer duration.

The cache optimizer service 201 may be in communication with each of the packaging device 206, the mid-tier cache 204, the edge cache 202, and the client device 208. The cache control module 203, via the cache optimizer service 201, may send a cache value, or updates thereto, to one or more of the packaging device 206, the mid-tier cache 204, the edge cache 202, or the client device 208. For example, the cache 220 of the mid-tier cache 204 and the cache 228 of the edge cache 202 may each store cache value for a requested content item (or a portion thereof). The cache control module 203 may send updates relating to the cache value for the requested content item to the mid-tier cache 204 and the edge cache 202. The metrics aggregator module 205 may generate the update relating to the cache value for the requested content item as the requested content item becomes more popular. The update relating to the cache value for the requested content may include an updated TTL element that may cause the cache 220 and the cache 228 to cache the requested content item for a longer period of time (e.g., as compared to the TTL element as originally received).

While FIG. 2 is described with only one packaging device 206, one mid-tier cache 204, one edge cache 202, one client device 208, one origin server 209, and one cache optimizer service 201 for ease of explanation, a person skilled in the art would appreciate there could a plurality of each of the devices. Also, while a single communication link is shown between each of the packaging device 206, the mid-tier cache 204, the edge cache 202, the origin server 209, the cache optimizer service 201, and the client device 208 for ease of explanation, a person skilled in the art would appreciate there may be multiple communication links between the devices, such as a communication link for a manifest, another communication link for video content, a third communication link for audio content, and so forth. Further, while the cache optimizer service 201 is shown as a separate entity/device for ease of explanation, it is to be understood that the cache optimizer service 201 may reside (e.g., be a part of) any of the packaging device 206, the mid-tier cache 204, the edge cache 202, or the origin server 209.

FIG. 3 shows an example table of cache values generated by the cache optimizer service 201, via the metrics aggregator module 205, for each of a plurality of content items (or portions thereof). Column 302 indicates an Asset ID (e.g., an identifier) for each of the plurality of content items. As shown in column 306, the metrics aggregator module 205 may determine a TTL element (e.g., a "max-age" as shown in FIG. 3 as a number of seconds) for each of the plurality of content items. The TTL element for a content item may initially be determined based on one or more of content metadata, historical requests, and/or the like, and the TTL element for the content item can be updated as described herein. As shown in column 304, the metrics aggregator module 205 may determine a separate TTL element for each respective manifest associated with each of the plurality of content items. By determining a separate TTL element for each respective manifest, the metrics aggregator module 205 may allow for more caching and distribution flexibility for a CDN, such as the system 100, in the event that a respective manifest changes at an origin server. For example, Asset ID 22 in FIG. 3 indicates a TTL value of 900 seconds at column 304 for a manifest associated with Asset ID 22 and a TTL value of 3600 seconds at column 306 for portions of content associated with Asset ID 22. In this way, an initial manifest for Asset ID 22 may have a shorter TTL value as compared to the content item itself, which may allow for the initial manifest to be updated/renewed more quickly than the content item itself (e.g., to account for adjusted break points for dynamic advertisement insertion).

As shown in column 308, the metrics aggregator module 205 may determine a Time Window for each of the plurality of content items. The Time Window for a content item may correspond to a time period during which the TTL element for the manifest and the TTL element for portions of the content item, shown in columns 304 and 306, respectively, are enforced. For example, FIG. 3 indicates a first TTL element for the manifest and portions of content associated with Asset ID 16 during a first time period (e.g., between 00:00:00 and 13:00:59). FIG. 3 also indicates a second TTL element for the manifest and portions of content associated with Asset ID 16 during a second time period (e.g., between 13:01:00 and 23:59:59). In this way, the cache value for Asset ID 16 can cause the manifest and portions of content associated with Asset ID 16 to be cached for a longer duration (e.g., 14400 seconds) when Asset ID 16 is more popular (e.g., during primetime hours). Further, the cache value for Asset ID 16 can cause the manifest and the portions of content associated with Asset ID 16 to be cached throughout primetime viewing hours, which may vary based on geographic location (e.g., time zone).

As discussed herein, the cache optimizer service 201, via the content metadata service module 207, may determine/retrieve popularity or demographic information associated with a requested content item. FIG. 3 shows, in column 310, example popularity and demographic information associated with each of the plurality of content items. As a content item becomes more or less popular, the popularity and demographic information associated with the content item in column 310 may change. For example, column 310 for Asset ID 7 indicates that Asset ID 7 is a popular advertisement. Accordingly, the TTL element for Asset ID 7 (e.g., the "max-age") has a relatively high value of 86,400 seconds. If column 310 for Asset ID 7 is updated to indicate that Asset ID 7 is a less popular advertisement, then the content metadata service module 207 may notify the cache optimizer service 201, which may update the TTL element for Assert ID 7 to a value that is less than 86,400 seconds.

As discussed herein, a content item may be encoded at a plurality of bitrates, and cache values may vary across the plurality of bitrates. For example, FIG. 3 indicates a TTL element with a value of 900 seconds for the manifest and a TTL element with a value of 3600 seconds for portions of content associated with Asset ID 22 that are encoded at a "High" bitrate, as indicated at column 314. FIG. 3 also indicates a TTL element with a value of 14400 seconds for the manifest and a TTL element with a value of 14400 seconds for portions of content associated with Asset ID 22 that are encoded at a "Medium" or "Low" bitrate, as indicated at column 314. In this way, some portions of a content item encoded at a lower bitrate may be cached for longer than other portions of the content item.

As indicated at column 312, the cache value for each of the plurality of content items (or portions thereof) may have an expiration time. The expiration time may be a time at which the cache device storing a content item (or portions thereof) will remove the cached content item (or portions thereof). A value of "NULL" in column 312 may indicate that a cached content item (or portions thereof) will expire based on its corresponding TTL element rather than at a predefined time.

As discussed herein, a cache value may be generated by the metrics aggregator module 205 for each caching device that caches a requested content item, as shown in column 316 of FIG. 3. For example, FIG. 3 indicates the manifest and portions of content associated with Asset ID 22 that are encoded at a "High" bitrate are to be stored at a mid-tier cache (e.g., mid-tier cache 204) for 900 seconds and 3600 seconds, respectively. FIG. 3 also indicates the manifest and portions of content associated with Asset ID 22 that are encoded at a "Medium" or "Low" bitrate are to be stored at an edge cache (e.g., edge cache 202) for 14400 seconds. Column 310 of FIG. 3 indicates Asset ID 22 is "highly popular." Thus, in this way, more popular content items may be stored/cached for longer durations of time at a caching device(s) that is closest geographically to a (e.g., client device 208). Further, FIG. 3 indicates the manifest and portions of content associated with Asset ID 22 that are encoded at a "High" bitrate are to be stored at the mid-tier cache for 900 seconds and 3600 seconds, respectively, for any time window during a day (e.g., as indicated by column 308). FIG. 3 also indicates the manifest and portions of content associated with Asset ID 22 that are encoded at a "Medium" or "Low" bitrate are to be stored at the edge cache (e.g., mid-tier cache 204) for 14400 seconds only during 17:00:00-23:59:59 (e.g., as indicated by column 308), which may correspond to primetime viewing hours. The manifest and portions of content associated with Asset ID 22 that are encoded at a "Medium" or "Low" bitrate may therefore be more quickly and efficiently accessed by user devices geographically nearby the edge cache during primetime viewing hours.

Figure 4:
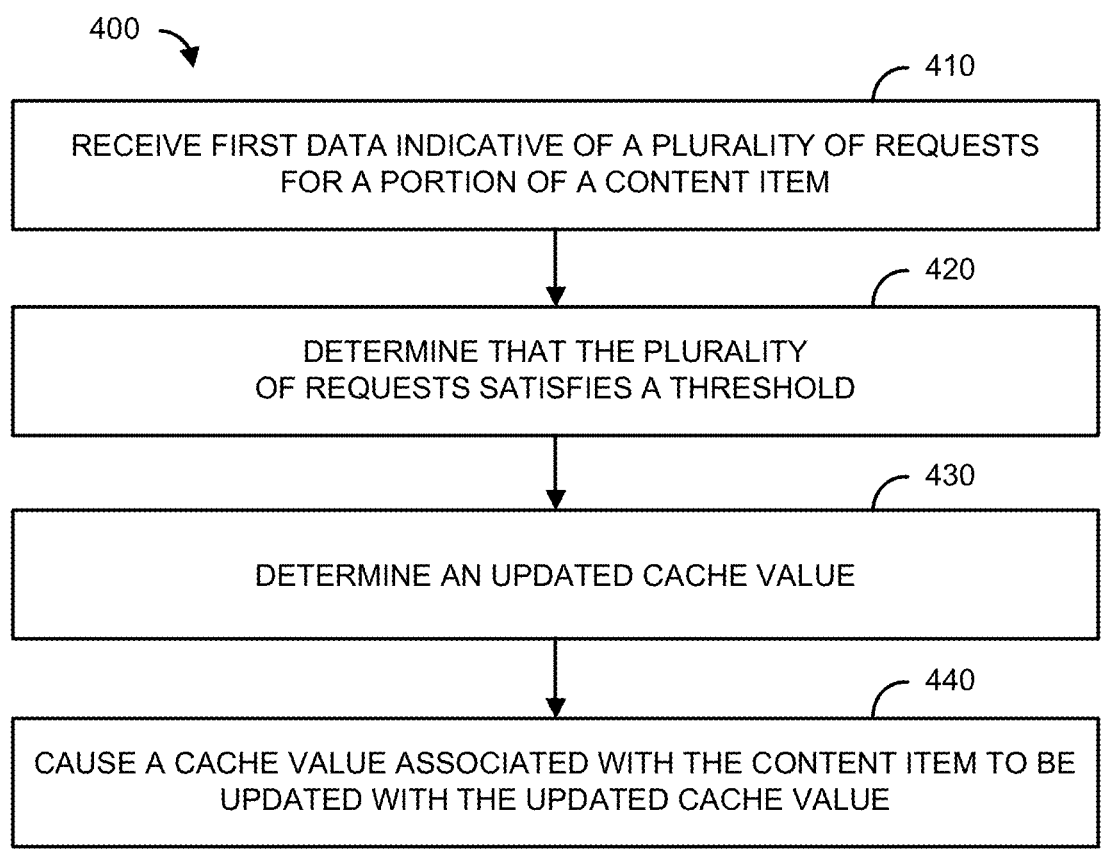
FIG. 4 shows a flowchart of an example method for cache optimization.

FIG. 4 is a flowchart of a method 400 for cache optimization in accordance with the present description. The method 400 may be implemented using the system 100 of FIG. 1 and/or the system 200 of FIG. 2. For example, the method 400 may be implemented by the cache optimizer service 201. At step 410, first data indicative of a plurality of requests for a first portion of a content item may be received. The plurality of requests may be received via/from a plurality of user devices, such as the mobile device 124, the communications terminal 122, the media device 120, the display device 121, the client device 208, and/or the like. The plurality of requests may be requests to receive the first portion of the content item from a caching device, such as the mid-tier cache 204 or the edge cache 202. The first portion of the content item may be associated with a cache value. The cache value may be associated with a first value for a time to live (TTL) element. The cache value may be cached/stored at the caching device.

At step 420, the plurality of requests may be determined to satisfy (e.g., meet or exceed) a threshold (e.g., cache control threshold), such as a popularity threshold associated with the content item. For example, a quantity of the plurality of requests may be determined (e.g., counted), and the quantity of the plurality of requests may be determined to satisfy the threshold. Determining the popularity of the content item may be based on a number of requests for the content item over a period of time satisfying the threshold. For example, the content item may initially be determined to be less popular overall at a first time point. A plurality of requests for the content item may be received during a defined period of time (e.g., 2 hours, etc.) ending at a second time point. The plurality of requests may satisfy (e.g., meet or exceed) the popularity threshold (e.g., 200 additional requests are received within a 2 hour timeframe). The content item may then be determined to be more popular at the second time point as compared to the first time point.

At step 430, an updated cache value may be determined. The updated cache value may be determined based on the threshold being satisfied. For example, the updated cache value may be a longer period of time (e.g., as compared to the cache value for the content item as originally received) such that the first portion of the content item is caused to be stored/cached at the caching device for a longer duration of time based on its increased popularity.

At step 440, the cache value for the content item may be updated with the updated cache value. For example, the TTL element associated with the cache value for the content item may be updated to reflect the updated cache value. The cache value for the content item may be updated by the cache optimizer service 201 and sent to the caching device. The caching device may then cause the TTL element to be updated with the updated cache value. The updated value for the TTL element may be greater than the first value for the TTL element. The updated value for the TTL element may cause the caching device to cache/store the first portion of the content item in memory until the updated TTL element expires.

The first portion of the content item may be encoded at a first bitrate, such as a low or medium bitrate. Second data may be received via/from one or more of the plurality of user devices. The second data may be indicative of a second plurality of requests for a second portion of the content item. The second portion of the content item may be encoded at a higher bitrate as compared to the first bitrate (e.g., encoded at a high bitrate rather than a low or medium bitrate).

The second plurality of requests may be determined to satisfy (e.g., meet or exceed) a second threshold (e.g., cache control threshold), such as a second popularity threshold associated with the content item. For example, a quantity of the second plurality of requests may be determined (e.g., counted), and the quantity of the second plurality of requests may be determined to satisfy the second threshold. A further cache value may be determined. The further cache value may be determined based on the second threshold being satisfied. The cache value for the content item may be updated with the further cache value. For example, the TTL element associated with the cache value may be updated to reflect the further cache value. The cache value may be updated by the cache optimizer service 201 and sent to the caching device. The caching device may then cause the TTL element to be updated with the further cache value. The further cache value may be greater than the updated cache value.

Figure 5:
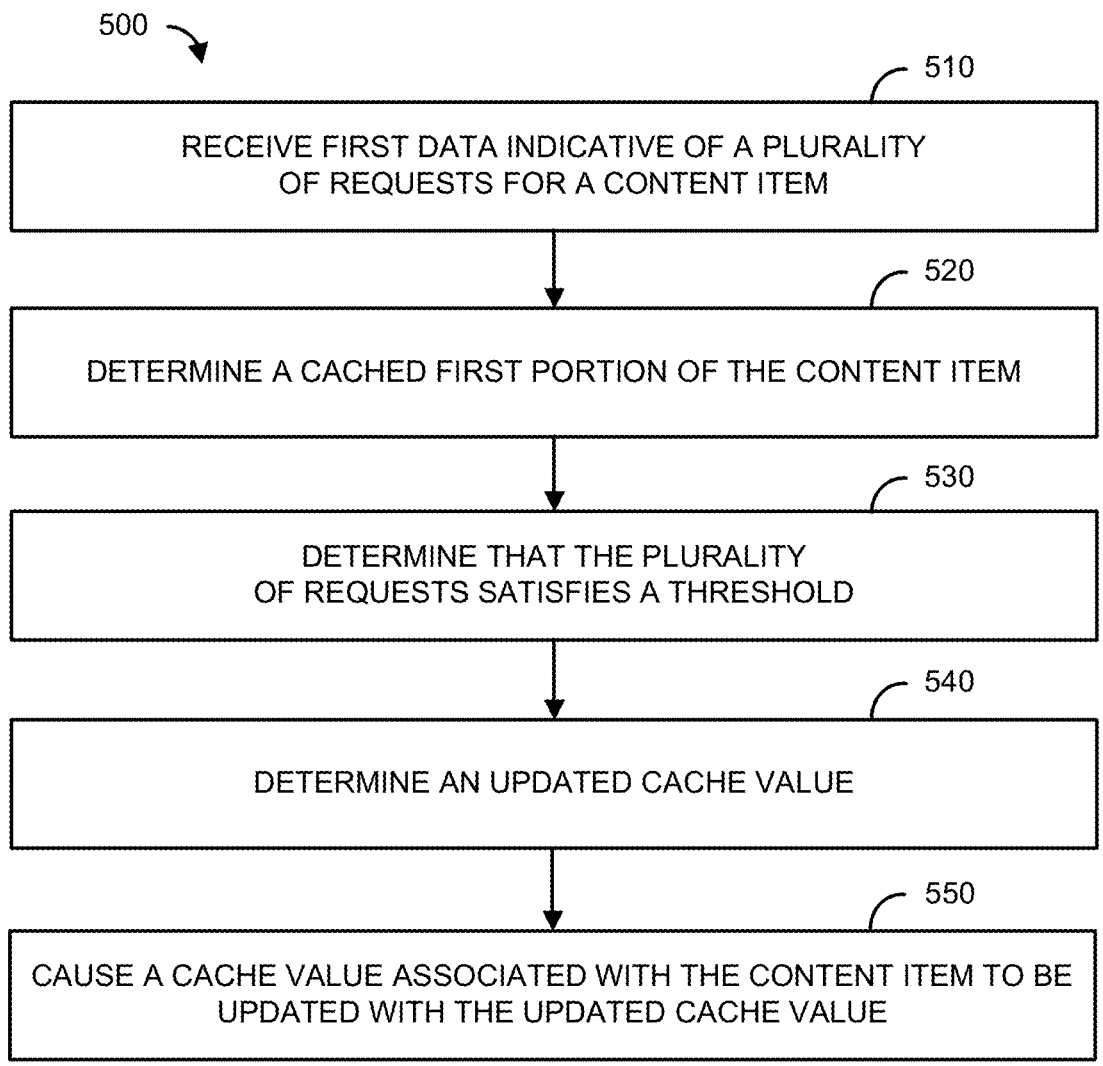
FIG. 5 shows a flowchart of an example method for cache optimization.

FIG. 5 is a flowchart of a method 500 for cache optimization in accordance with the present description. The method 500 may be implemented using the system 100 of FIG. 1 and/or the system 200 of FIG. 2. For example, the method 500 may be implemented by the cache optimizer service 201. At step 510, first data indicative of a plurality of requests for a content item may be received. The plurality of requests may be received via/from a plurality of user devices, such as the mobile device 124, communications terminal 122, the media device 120, the display device 121, the client device 208, and/or the like. The plurality of requests may be requests to receive the content item at a plurality of bitrates from one or more caching devices, such as the mid-tier cache 204 or the edge cache 202.

At step 520, a cached first portion of the content item may be determined (e.g., located at a cache device). The cached first portion of the content item may be encoded at a first bitrate of the plurality of bitrates. The cached first portion of the content item may be associated with a cache value. The cache value may be associated with a first value for a time to live (TTL) element. The cache value and the cached first portion of the content item may be cached/stored at a first caching device of the one or more caching devices. The first caching device may send the cached first portion of the content item encoded at the first bitrate to the plurality of user devices (e.g., irrespective of the bitrate associated with each corresponding request from each user device).

At step 530, the plurality of requests may be determined to satisfy (e.g., meet or exceed) a threshold (e.g., cache control threshold), such as a popularity threshold associated with the content item. For example, a quantity of the plurality of requests may be determined (e.g., counted), and the quantity of the plurality of requests may be determined to satisfy the threshold. Determining the popularity of the content item may be based on a number of requests for the content item over a period of time satisfying the threshold. For example, the content item may initially be determined to be less popular overall at a first time point. A plurality of requests for the content item may be received during a defined period of time (e.g., 2 hours, etc.) ending at a second time point. The plurality of requests may satisfy (e.g., meet or exceed) the popularity threshold (e.g., 200 additional requests are received within a 2 hour timeframe). The content item may then be determined to be more popular at the second time point as compared to the first time point.

At step 540, an updated cache value may be determined. The updated cache value may be determined based on the threshold being satisfied. For example, the updated cache value may be a longer period of time (e.g., as compared to the cache value as originally received) such that the first portion of the content item is caused to be stored/cached for a longer duration of time based on its increased popularity.

At step 550, the cache value for the content item may be updated with the updated cache value. For example, the TTL element associated with the cache value may be updated to reflect the updated cache value. The cache value may be updated by the cache optimizer service 201 and sent to the first caching device. The first caching device may then cause the TTL element associated with the cache value to be updated with the updated cache value. The updated value for the TTL element may be greater than the first value for the TTL element. The updated value of the TTL element may cause the first caching device to cache/store the first portion of the content item in memory until the updated TTL element expires.

Second data may be received via/from one or more of the plurality of user devices. The second data may be indicative of a second plurality of requests for a second portion of the content item encoded at a second bitrate of the plurality of bitrates. The second bitrate may be a higher bitrate as compared to the first bitrate (e.g., encoded at a high bitrate rather than a low or medium bitrate).

The second plurality of requests may be determined to satisfy (e.g., meet or exceed) a second threshold (e.g., cache control threshold), such as a second popularity threshold associated with the content item. For example, a quantity of the second plurality of requests may be determined (e.g., counted), and the quantity of the second plurality of requests may be determined to satisfy the second threshold. A further cache value may be determined. The further cache value may be determined based on the second threshold being satisfied. The cache value for the content item may be updated with the further cache value. For example, the TTL element associated with the cache value may be updated to reflect the further cache value. The cache value may be updated by the cache optimizer service 201 and sent to the cache device. The cache device may then cause the TTL element to be updated with the further cache value. The further cache value may be greater than the updated cache value.

Figure 6:
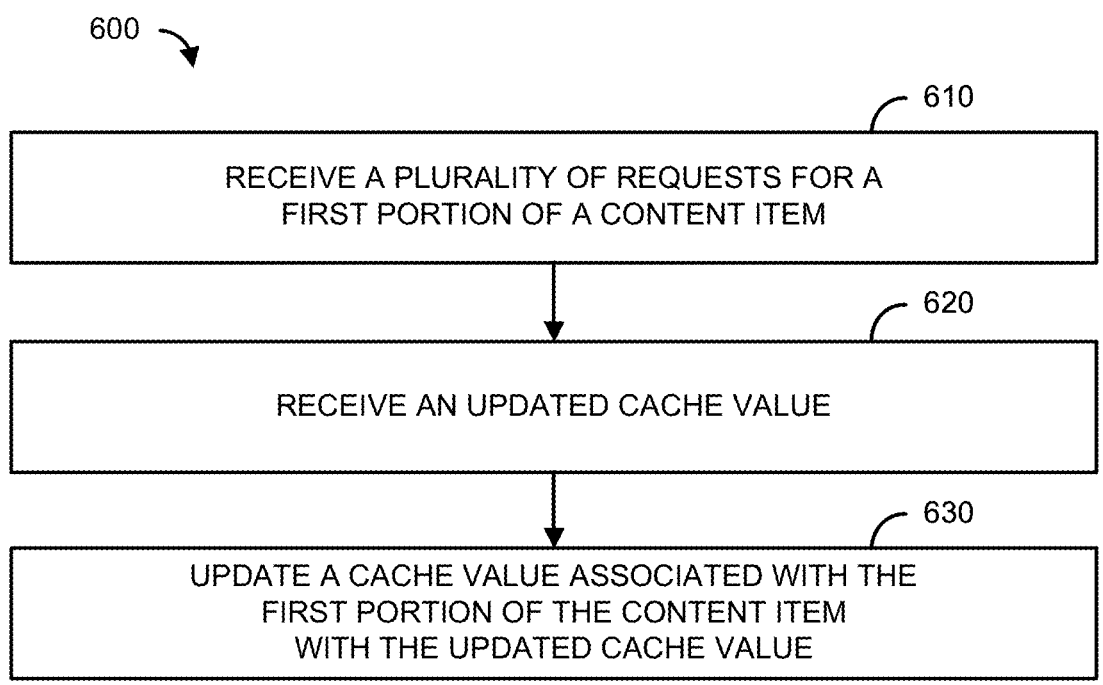
FIG. 6 shows a flowchart of an example method for cache optimization.

FIG. 6 is a flowchart of a method 600 for cache optimization in accordance with the present description. The method 600 may be implemented using the system 100 of FIG. 1 and/or the system 200 of FIG. 2. For example, method 600 may be implemented by a caching device, such as the mid-tier cache 204 or the edge cache 202. At step 610, a plurality of requests for a first portion of a content item may be received. The plurality of requests may be received via/from a plurality of user devices, such as the mobile device 124, communications terminal 122, the media device 120, the display device 121, the client device 208, and/or the like. The first portion of the content item may be associated with a cache value. The cache value may be associated with a first value for a time to live (TTL) element. The cache value may be cached/stored at the caching device.

The caching device may send the plurality of requests to a computing device, such as the cache optimizer service 201. The plurality of requests may be determined by the computing device to satisfy (e.g., meet or exceed) a threshold (e.g., a cache control threshold), such as a popularity threshold associated with the content item. Determining the popularity of the content item may be based on a number of requests for the content item over a period of time satisfying the threshold. For example, the content item may initially be determined to be less popular overall at a first time point. A plurality of requests for the content item may be received by the computing device during a defined period of time (e.g., 2 hours, etc.) ending at a second time point. The plurality of requests may satisfy (e.g., meet or exceed) the popularity threshold (e.g., 200 additional requests are received within a 2 hour timeframe). The content item may then be determined by the computing device to be more popular at the second time point as compared to the first time point. The computing device may determine an updated cache value. The updated cache value may be determined based on the threshold being satisfied. The computing device may update the TTL element based on the updated cache value. The computing device may send the updated cache value to the caching device.

At step 620, the caching device may receive the updated cache value (e.g., via/from the computing device). The updated cache value may be a longer period of time (e.g., as compared to the cache value as originally received) such that the first portion of the content item is caused to be stored/cached for a longer duration of time based on its increased popularity. At step 630, the cache value for the first portion of the content item may be updated with the updated cache value. For example, the TTL element associated with the cache value for the first portion of the content item may be updated to reflect the updated cache value. The caching device may cause the TTL element to be updated with the updated cache value. The updated value for the TTL element may cause the caching device to cache/store the first portion of the content item in memory until the updated TTL element expires.

The plurality of requests may be requests to receive the content item at a plurality of bitrates. The first portion of the content item may be encoded at a first bitrate of the plurality of bitrates, such as a low or medium bitrate. A second plurality of requests for a second portion of the content item may be received at the caching device via/from one or more of the plurality of user devices. The second portion of the content item may be encoded at a higher bitrate as compared to the first bitrate (e.g., encoded at a high bitrate rather than a low or medium bitrate).

The second plurality of requests may be determined by the computing device to satisfy (e.g., meet or exceed) a second threshold, such as a second popularity threshold associated with the content item. A further cache value may be determined by the computing device. The further cache value may be determined by the computing device based on the second threshold being satisfied. The further cache value may be sent by the computing device to the caching device. The caching device may then cause the TTL element to be updated with the further cache value. The further cache value may be greater than the updated cache value.

Figure 7:
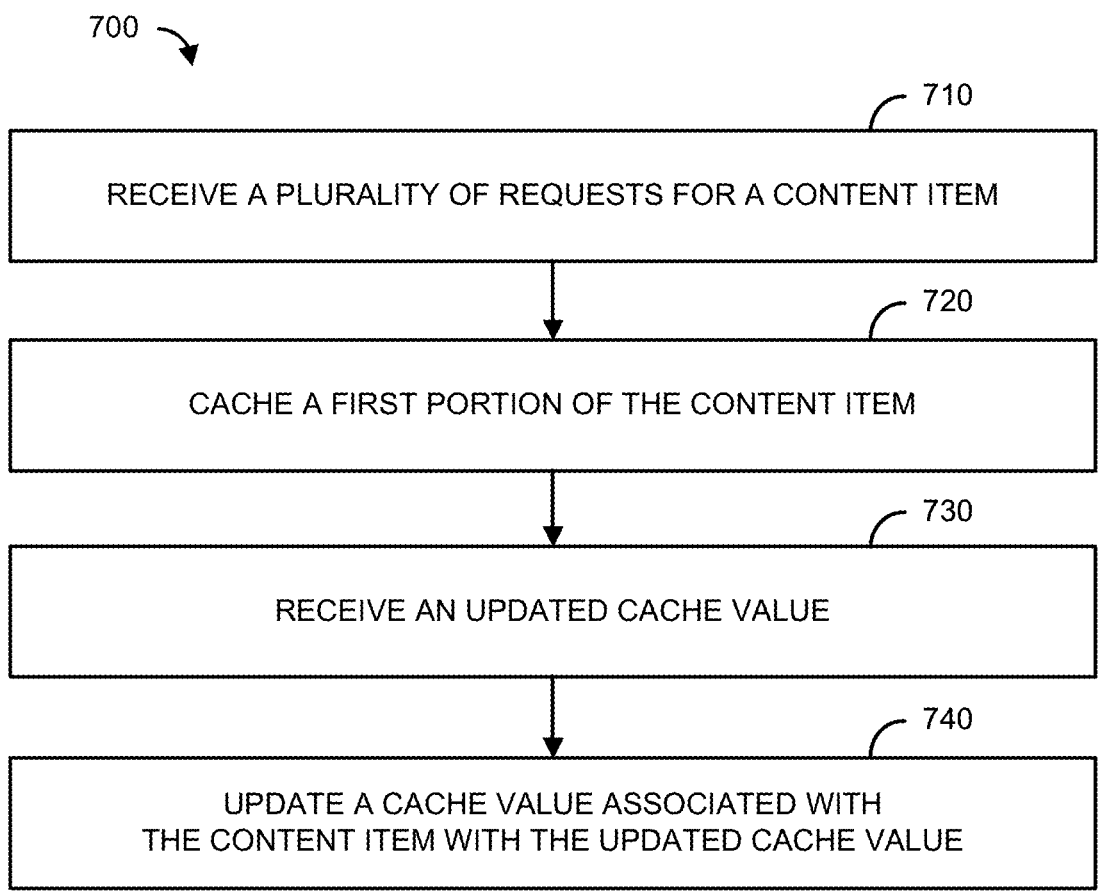
FIG. 7 shows a flowchart of an example method for cache optimization.

FIG. 7 is a flowchart of a method 700 for cache optimization in accordance with the present description. The method 700 may be implemented using the system 100 of FIG. 1 and/or the system 200 of FIG. 2. For example, the method 700 may be implemented by a caching device, such as the mid-tier cache 204 or the edge cache 202. At step 710, a plurality of requests for a content item may be received at the caching device. The plurality of requests may be received via/from a plurality of user devices, such as the mobile device 124, communications terminal 122, the media device 120, the display device 121, the client device 208, and/or the like. The plurality of requests may be requests to receive the content item at a plurality of bitrates from the caching device. At step 720, a first portion of the content item may be cached at the caching device. The cached first portion of the content item may be encoded at a first bitrate of the plurality of bitrates. The first portion of the content item may be associated with a cache value. The cache value may be associated with a first value for a time to live (TTL) element. The cache value may be cached/stored at the caching device. The caching device may send the cached first portion of the content item encoded at the first bitrate to the plurality of user devices (e.g., irrespective of the bitrate associated with each corresponding request from each user device).

The caching device may send first data indicative of the plurality of requests to a computing device, such as the cache optimizer service 201. The plurality of requests may be determined by the computing device to satisfy (e.g., meet or exceed) a threshold (e.g., cache control threshold), such as a popularity threshold associated with the content item. Determining the popularity of the content item may be based on a number of requests for the content item over a period of time satisfying the threshold. For example, the content item may initially be determined to be less popular overall at a first time point. A plurality of requests for the content item may be received by the computing device during a defined period of time (e.g., 2 hours, etc.) ending at a second time point. The plurality of requests may satisfy (e.g., meet or exceed) the popularity threshold (e.g., 200 additional requests are received within a 2 hour timeframe). The content item may then be determined by the computing device to be more popular at the second time point as compared to the first time point. The computing device may determine an updated cache value for the first portion of the content item. The updated cache value may be determined based on the threshold being satisfied. The computing device may send the updated cache value to the caching device.

At step 730, the caching device may receive the updated cache value (e.g., via/from the computing device). The updated cache value may be a longer period of time (e.g., as compared to the cache value as originally received) such that the first portion of the content item is caused to be stored/cached for a longer duration of time based on its increased popularity. At step 740, the cache value for the content item may be updated with the updated cache value. For example, the TTL element associated with the cache value may be updated to reflect the updated cache value. The caching device may cause the TTL element to be updated with the updated cache value. The updated value for the TTL element may cause the caching device to cache/store the first portion of the content item in memory until the updated TTL element expires.

A second plurality of requests for a second portion of the content item may be received at the caching device via/from one or more of the plurality of user devices. The second portion of the content item may be encoded at a higher bitrate as compared to the first bitrate (e.g., encoded at a high bitrate rather than a low or medium bitrate). The second plurality of requests may be determined by the computing device to satisfy (e.g., meet or exceed) a second threshold, such as a second popularity threshold associated with the content item. A further cache value may be determined by the computing device. The further cache value may be determined by the computing device based on the second threshold being satisfied. The further cache value may be sent by the computing device to the caching device. The caching device may then cause the TTL element to be updated with the further cache value. The further cache value may be greater than the updated cache value. Further pluralities of requests for further portion(s) (or the same portions described above) for the content item may be received. The further pluralities of requests may be may be determined by the computing device to satisfy (e.g., meet or exceed) a further threshold(s) or not satisfy the further threshold(s). The TTL element for the further portion(s) (or the same portions described above) for the content item may be continuously and dynamically updated based on the further pluralities of requests satisfying (e.g., the TTL element value would remain the same or be increased) or not satisfying further threshold(s) (e.g., the TTL element value would remain the same or decrease). As another example, the TTL element for the further portion(s) (or the same portions described above) for the content item may be updated in batches rather than continuously and dynamically (e.g., to prevent network or computational overload). A batch, or batches, of the further pluralities of requests may be received at a given interval (e.g., once a minute, once an hour, etc.). The TTL element for the may be updated based on the batch, or batches, of the further pluralities of requests satisfying (e.g., the TTL element value would remain the same or be increased) or not satisfying further threshold(s) (e.g., the TTL element value would remain the same or decrease).

Figure 8:
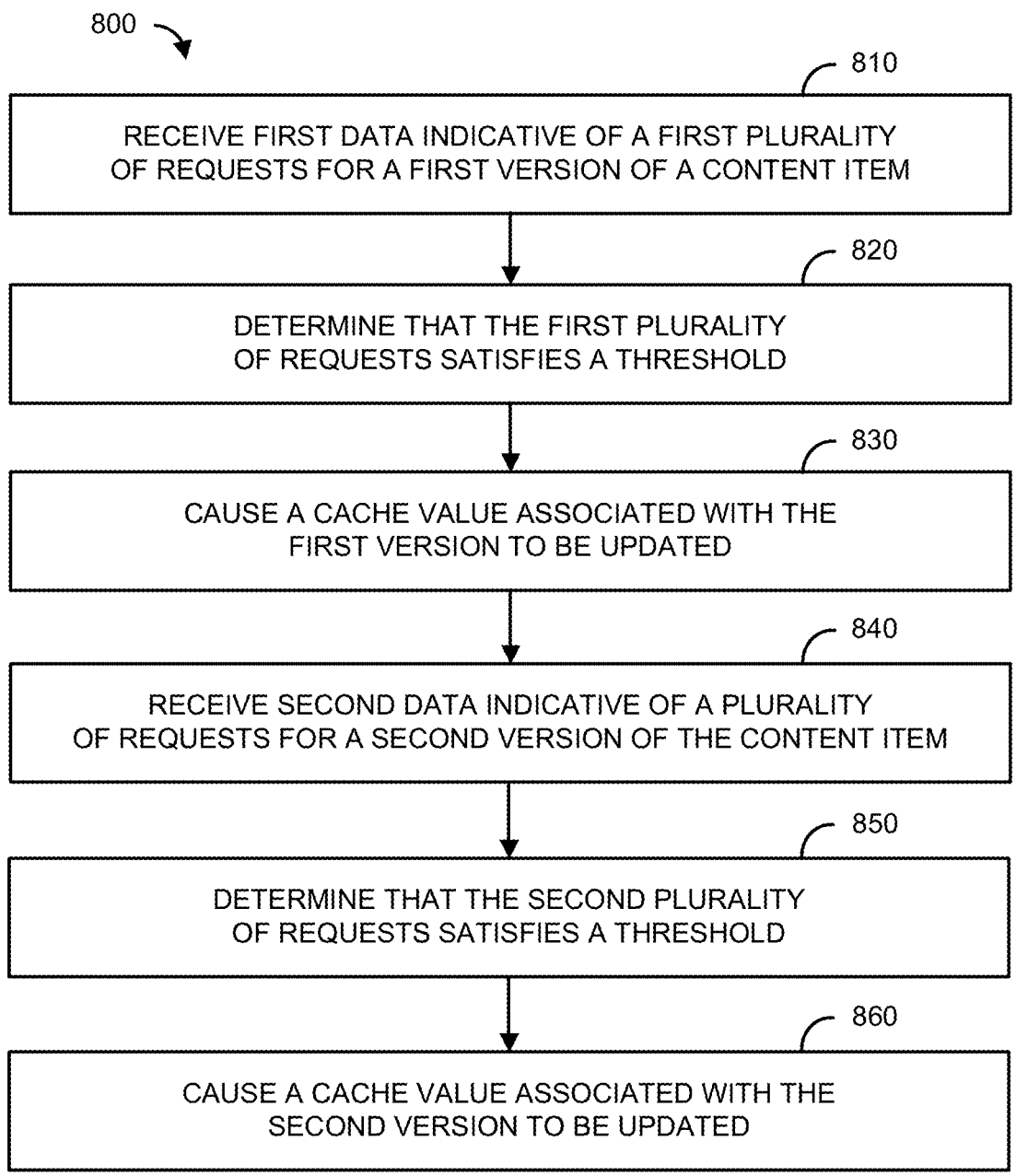
FIG. 8 shows a flowchart of an example method for cache optimization.

FIG. 8 is a flowchart of a method 800 for cache optimization in accordance with the present description. The method 800 may be implemented using the system 100 of FIG. 1 and/or the system 200 of FIG. 2. For example, the method 800 may be implemented by the cache optimizer service 201. At step 810, first data indicative of a first plurality of requests for a first version of a content item may be received. The first version of the content item (or a portion thereof) may be associated with a first bitrate of a plurality of bitrates (e.g., low, medium, high, etc.). The first plurality of requests may be received via/from a plurality of user devices, such as the mobile device 124, communications terminal 122, the media device 120, the display device 121, the client device 208, and/or the like. The first plurality of requests may be requests to receive the first version of the content item (or a portion thereof) at the first bitrate from one or more caching devices, such as the mid-tier cache 204 or the edge cache 202.

A cached portion of the first version of the content item may be determined (e.g., located at a cache device). The cached portion of the first version of the content item may be encoded at the first bitrate. The cached portion of the first version of the content item may be associated with a cache value that is associated with a first value for a time to live (TTL) element. The cache value and the cached portion of the first version of the content item may be cached/stored at a first caching device of the one or more caching devices. The first caching device may send the cached portion of the first version of the content item encoded at the first bitrate to the plurality of user devices.

At step 820, the first plurality of requests may be determined to satisfy (e.g., meet or exceed) a threshold (e.g., cache control threshold), such as a popularity threshold associated with the first version of the content item (or a portion thereof). For example, a quantity of the first plurality of requests may be determined (e.g., counted), and the quantity of the first plurality of requests may be determined to satisfy the threshold. Determining the popularity of the first version of the content item (or a portion thereof) may be based on a number of requests received over a period of time satisfying the threshold. For example, the first version of the content item (or a portion thereof) may initially be determined to be less popular overall at a first time point. A further plurality of requests for the first version of the content item (or a portion thereof) may be received during a defined period of time (e.g., 2 hours, etc.) ending at a second time point. The further plurality of requests may satisfy (e.g., meet or exceed) the popularity threshold (e.g., 200 additional requests are received within a 2 hour timeframe). The first version of the content item (or a portion thereof) may then be determined to be more popular at the second time point as compared to the first time point.

An updated cache value may be determined. The updated cache value may be determined based on the threshold being satisfied. For example, the updated cache value may be a longer period of time (e.g., as compared to the cache value as originally received) such that the first version of the content item (or a portion thereof) is caused to be stored/cached for a longer duration of time based on its increased popularity.

At step 830, the cache value for the first version of the content item (or a portion thereof) may be updated with the updated cache value. For example, the TTL element may be updated to reflect the updated cache value. The cache value may be updated by the cache optimizer service 201 and sent to the first caching device. The first caching device may then cause the TTL element to be updated with the updated cache value. The updated cache value for the TTL element may be greater than the first value for the TTL element. The updated cache value of the TTL element may cause the first caching device to cache/store the first version of the content item (or a portion thereof) in memory until the updated TTL element expires.

At step 840, second data indicative of a second plurality of requests for a second version of the content item may be received. The second plurality of requests may be received via/from a plurality of user devices, such as the mobile device 124, communications terminal 122, the media device 120, the display device 121, the client device 208, and/or the like. The second plurality of requests may be received via/from the plurality of user devices associated with the first plurality of requests. The second version of the content item (or a portion thereof) may be associated with a second bitrate of the plurality of bitrates (e.g., low, medium, high, etc.). The second plurality of requests may be requests to receive the second version of the content item (or a portion thereof) at the second bitrate from one or more caching devices, such as the mid-tier cache 204 or the edge cache 202. The second bitrate may be greater than or less than the first bitrate A cached portion of second version of the content item may be determined (e.g., located at a cache device). The cached portion of the second version of the content item may be encoded at the second bitrate. The cached portion of the second version of the content item may be associated with a cache value that is associated with a cache value for a TTL element. The cache value and the cached portion of the second version of the content item may be cached/stored at the first caching device of the one or more caching devices, or it may be stored at a second caching device of the one or more caching devices. The caching device at which the cached portion of the second version of the content item is stored may send the cached portion of the second version of the content item encoded at the second bitrate to the plurality of user devices.

At step 850, the second plurality of requests may be determined to satisfy (e.g., meet or exceed) a threshold (e.g., cache control threshold), such as a popularity threshold associated with the second version of the content item (or a portion thereof). For example, a quantity of the second plurality of requests may be determined (e.g., counted), and the quantity of the second plurality of requests may be determined to satisfy the threshold. Determining the popularity of the second version of the content item (or a portion thereof) may be based on a number of requests received over a period of time satisfying the threshold. For example, the second version of the content item (or a portion thereof) may initially be determined to be less popular overall at a first time point. A further plurality of requests for the second version of the content item (or a portion thereof) may be received during a defined period of time (e.g., 2 hours, etc.) ending at a second time point. The further plurality of requests for the second version of the content item (or a portion thereof) may satisfy (e.g., meet or exceed) the popularity threshold (e.g., 200 additional requests are received within a 2 hour timeframe). The second version of the content item (or a portion thereof) may then be determined to be more popular at the second time point as compared to the first time point. A further cache value may be determined. The further cache value may be determined based on the second plurality of requests satisfying the threshold. For example, the further cache value may be a period of time such that the second version of the content item (or a portion thereof) is caused to be stored/cached for a longer duration of time based on its increased popularity.

At step 860, the cache value for the second version of the content item (or a portion thereof) may be updated with the further cache value. For example, the TTL element associated with the second version of the content item (or a portion thereof) may be updated to reflect the further cache value. The cache value for the TTL element associated with the second version of the content item may be updated by the cache optimizer service 201 and sent to the caching device at which the second version of the content item (or a portion thereof) is stored. The caching device at which the second version of the content item (or a portion thereof) is stored may then cause the TTL element associated with the second version of the content item (or a portion thereof) to be updated with the further cache value. The further cache value may be greater than an original cache value for the TTL element associated with the second version of the content item (or a portion thereof). The further cache value may cause the caching device at which the second version of the content item (or a portion thereof) is stored to cache/store the second version of the content item (or a portion thereof) in memory until the updated TTL element associated with the second version of the content item expires.

Figure 9:
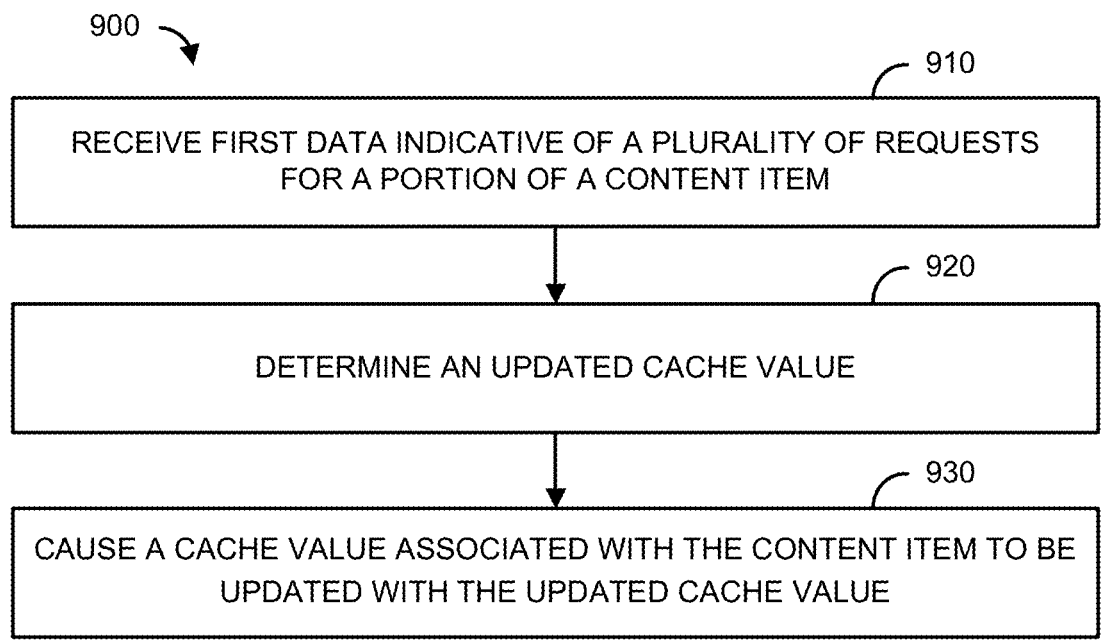
FIG. 9 shows a flowchart of an example method for cache optimization.

FIG. 9 is a flowchart of a method 900 for cache optimization in accordance with the present description. The method 900 may be implemented using the system 100 of FIG. 1 and/or the system 200 of FIG. 2. For example, the method 900 may be implemented by the cache optimizer service 201. At step 910, first data indicative of a plurality of requests for a first portion of a content item may be received. The plurality of requests may be received via/from a plurality of user devices, such as the mobile device 129, the communications terminal 122, the media device 120, the display device 121, the client device 208, and/or the like. The plurality of requests may be requests to receive the first portion of the content item from a caching device, such as the mid-tier cache 204 or the edge cache 202. The first portion of the content item may be associated with a cache value. The cache value may be associated with a first value for a time to live (TTL) element. The cache value may be cached/stored at the caching device.

At step 920, an updated cache value may be determined. The updated cache value may be a longer period of time (e.g., as compared to the cache value as originally received) such that the first portion of the content item is caused to be stored/cached at the caching device for a longer duration of time. The updated cache value may be determined based on an increased level of popularity for the content item. For example, the plurality of requests may satisfy (e.g., meet or exceed) a threshold (e.g., cache control threshold), such as a popularity threshold associated with the content item. As another example, the increased level of popularity for the content item may be provided directly (e.g., by an administrator of the cache optimizer service 201). As a further example, the updated cache value may be determined based on a predicted increase in the level of popularity for the content item. Other methods and/or events may be used as a basis for determining the updated cache value.

At step 930, the cache value for the content item may be updated with the updated cache value. For example, the TTL element associated with the cache value may be updated to reflect the updated cache value. The cache value may be updated by the cache optimizer service 201 and sent to the caching device. The caching device may then cause the TTL element to be updated with the updated cache value. The updated value may be greater than the first value for the TTL element. The updated value for the TTL element may cause the caching device to cache/store the first portion of the content item in memory until the updated TTL element expires.

Figure 10:
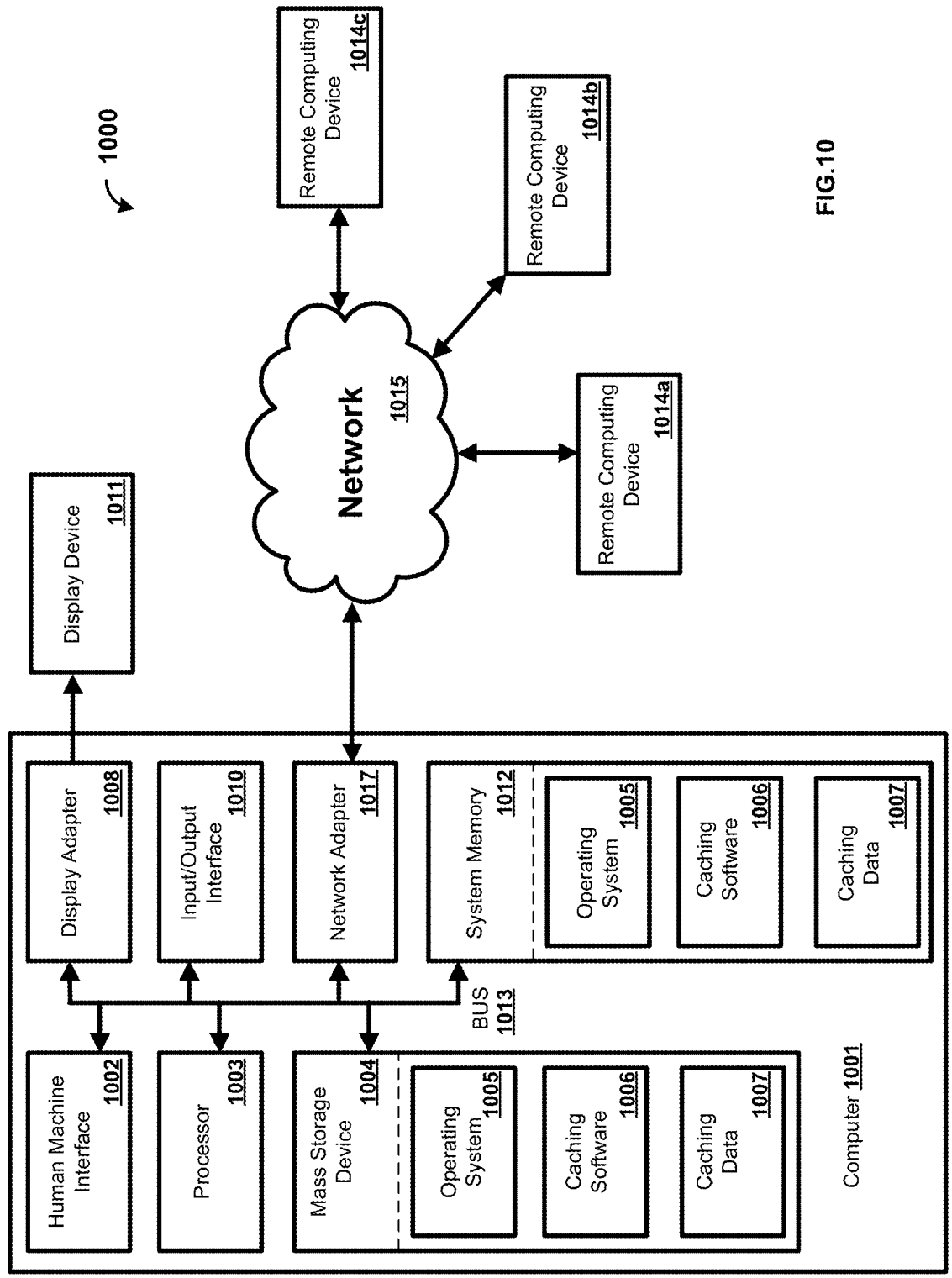
FIG. 10 shows a block diagram of an example computing device.

FIG. 10 shows a system 1000 for cache optimization in accordance with the present description. The central location 101, the server 110, the mobile device 124, the application server 126, the content source 127, and/or the edge device 128 of FIG. 1 may each be a computer 1001 as shown in FIG. 10. Each of the devices/entities shown in FIG. 2 may be a computer 1001 as shown in FIG. 10. The computer 1001 may comprise one or more processors 1003, a system memory 1012, and a bus 1013 that couples various system components including the one or more processors 1003 to the system memory 1012. In the case of multiple processors 1003, the computer 1001 may utilize parallel computing. The bus 1013 is one or more of several possible types of bus structures, including a memory bus or memory controller, a peripheral bus, an accelerated graphics port, or local bus using any of a variety of bus architectures.

The computer 1001 may operate on and/or comprise a variety of computer readable media (e.g., non-transitory media). The readable media may be any available media that is accessible by the computer 1001 and may include both volatile and non-volatile media, removable and non-removable media. The system memory 1012 has computer readable media in the form of volatile memory, such as random access memory (RAM), and/or non-volatile memory, such as read only memory (ROM). The system memory 1012 may store data such as the caching data 1007 and/or program modules such as the operating system 1005 and the caching software 1006 that are accessible to and/or are operated on by the one or more processors 1003.

The computer 1001 may also have other removable/non-removable, volatile/non-volatile computer storage media. FIG. 10 shows the mass storage device 1004 which may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004, such as the operating system 1005 and the caching software 1006. Each of the operating system 1005 and the caching software 1006 (e.g., or some combination thereof) may have elements of the program modules and the caching software 1006. The caching data 1007 may also be stored on the mass storage device 1004. The caching data 1007 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1015.

A user may enter commands and information into the computer 1001 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human machine interface 1002 that is coupled to the bus 1013, but may be connected by other interface and bus structures, such as a parallel port, game port, an IEEE 1394 Port (also known as a Firewire port), a serial port, network adapter 1017, and/or a universal serial bus (USB).

The display device 1011 may also be connected to the bus 1013 via an interface, such as a display adapter 1008. It is contemplated that the computer 1001 may have more than one display adapter 1008 and the computer 1001 may have more than one display device 1011. The display device 1011 may be a monitor, an LCD (Liquid Crystal Display), light emitting diode (LED) display, television, smart lens, smart glass, and/or a projector. In addition to the display device 1011, other output peripheral devices may be components such as speakers (not shown) and a printer (not shown) which may be connected to the computer 1001 via the Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computer 1001 may be part of one device, or separate devices.

The computer 1001 may operate in a networked environment using logical connections to one or more remote computing devices 1014a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1001 and a remote computing device 1014a,b,c may be made via a network 1015, such as a local area network (LAN) and/or a general wide area network (WAN). Such network connections may be through the network adapter 1017. The network adapter 1017 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the one or more processors 1003 of the computer. An implementation of the caching software 1006 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a computing device, first data indicative of a plurality of requests for a first portion of a content item, wherein the first portion is associated with a first value indicating a first amount of time for at least one of: the first portion or a manifest file for the content item to be stored in cache at a first cache location, and wherein the first amount of time is based on the first cache location;
determining that a quantity of the plurality of requests satisfies a threshold;
determining, based on the threshold being satisfied, and based on the first cache location, a second value indicating a second amount of time for at least one of: the first portion or the manifest file to be stored in cache at the first cache location, wherein the first amount of time is different than the second amount of time; and
causing the first value to be updated with the second value.

2. The method of claim 1, wherein the first amount of time is associated with a first time period, and wherein the second amount of time is associated with at least one of: the first time period or a second time period.

3. The method of claim 2, wherein at least one of:
the second amount of time is greater than the first amount of time;
the second amount of time is less than the first amount of time;
the first time period comprises a first time window during which the first amount of time is enforced at the first cache location; or
the second time period comprises a second time window during which the second amount of time is enforced at the first cache location.

4. The method of claim 1, wherein causing the first value to be updated with the second value comprises:
sending, to a cache device at the first cache location, the second value, wherein the cache device causes the first value to be updated with the second value.

5. The method of claim 4, wherein the updated first value causes the cache device to cache at least one of: the first portion or the manifest file for the content item in memory until the second value expires.

6. The method of claim 1, wherein the first portion of the content item is encoded at a first bitrate, and wherein determining the second value comprises:
determining, based on the threshold being satisfied, and based on the first cache location and the first bitrate, the second value indicating the second amount of time for at least one of: the first portion or the manifest file to be stored in cache at the first cache location.

7. The method of claim 1, wherein the first portion of the content item is encoded at a first bitrate and the method further comprises:
receiving second data indicative of a second plurality of requests for a second portion of the content item, wherein the second portion is encoded at a higher bitrate as compared to the first bitrate;
determining that a quantity of the second plurality of requests satisfies a second threshold;
determining, based on the second threshold being satisfied, a third value indicating a third amount of time for the first portion to be stored in cache, wherein the third amount of time is different than the second amount of time; and
causing the first value to be updated with the third value.

8. A method comprising:
receiving, by a first computing device, first data indicative of a plurality of requests for a content item,
determining a cached first portion of the content item, wherein the cached first portion is encoded at a first bitrate and is associated with a first value indicating a first amount of time for at least one of: the first portion or a manifest file for the content item to be stored in cache at a first cache location, and wherein the first amount of time is based on the first cache location;
determining that a quantity of the plurality of requests satisfies a threshold;
determining, based on the threshold being satisfied, and based on the first cache location, a second value indicating a second amount of time for at least one of: the first portion or the manifest file to be stored in cache at the first cache location, wherein the second amount of time is different than the first amount of time; and
causing the first value to be updated with the second value.

9. The method of claim 8, wherein the plurality of requests comprises a plurality of requests for the content item at a plurality of bitrates, wherein the first bitrate is one of the plurality of bitrates.

10. The method of claim 8, wherein the plurality of requests are received by a cache device at the first cache location, and wherein the method further comprises:
sending, by the cache device at the first cache location, based on the plurality of requests, the cached first portion of the content item encoded at the first bitrate.

11. The method of claim 8, wherein causing the first value to be updated with the second value comprises:
sending, to a cache device at the first cache location, the second value, wherein the cache device causes the first value to be updated with the second value.

12. The method of claim 11, wherein the updated first value causes the cache device to cache at least one of: the first portion or the manifest file for the content item in memory until the second value expires.

13. The method of claim 12, further comprising:
receiving second data indicative of a second plurality of requests for a second portion of the content item, wherein the second plurality of requests comprises a plurality of requests for the content item encoded at a second bitrate of a plurality of bitrates;
determining that a quantity of the second plurality of requests satisfies a second threshold;
determining, based on the second threshold being satisfied, a third value indicating a third amount of time for the first portion to be stored in cache, wherein the third amount of time is different than the second amount of time; and
causing the first value to be updated with the third value.

14. The method of claim 8, wherein the first amount of time is associated with a first time period, wherein the second amount of time is associated with at least one of: the first time period or a second time period, and wherein at least one of:
the second amount of time is greater than the first amount of time;
the second amount of time is less than the first amount of time;
the first time period comprises a first time window during which the first amount of time is enforced at the first cache location; or
the second time period comprises a second time window during which the second amount of time is enforced at the first cache location.

15. A method comprising:
receiving, by a first computing device, a plurality of requests for a first portion of a content item, wherein the first portion is associated with a first value indicating a first amount of time for at least one of: the first portion or a manifest file for the content item to be stored in cache at a first cache location, and wherein the first amount of time is based on the first cache location;
receiving, via a second computing device, a second value indicating a second amount of time for at least one of: the first portion or the manifest file to be stored in cache at the first cache location, wherein the second amount of time is different than the first amount of time; and
updating the first value with the second value.

16. The method of claim 15, wherein the first amount of time is associated with a first time period, wherein the second amount of time is associated with at least one of: the first time period or a second time period, and wherein at least one of:
the second amount of time is greater than the first amount of time;
the second amount of time is less than the first amount of time;
the first time period comprises a first time window during which the first amount of time is enforced by the first computing device; or
the second time period comprises a second time window during which the second amount of time is enforced by the first computing device.

17. The method of claim 15, further comprising:
determining, by the second computing device, that a quantity of the plurality of requests satisfies a threshold;
determining, based on the threshold being satisfied, and based on the first cache location, the second value; and
sending, to the first computing device, the second value, wherein the first computing device causes the first value to be updated with the second value.

18. The method of claim 15, wherein the updated first value causes the first computing device to cache at least one of: the first portion or the manifest file for the content item in memory until the second value expires.

19. The method of claim 15, wherein the plurality of requests comprises requests to receive the first portion at a plurality of bitrates.

20. The method of claim 19, further comprising:
- receiving a second plurality of requests for a second portion of the content item, wherein the second portion is encoded at a higher bitrate as compared to the first portion;
- receiving, via the second computing device, a third value indicating a third amount of time for the first portion to be stored in cache, wherein the third amount of time is different than the second amount of time; and
- updating the first value with the third value.

* * * * *